(No Model.)
V. G. RICHEY.
SEED PLANTER.
No. 526,744.
Patented Oct. 2, 1894.
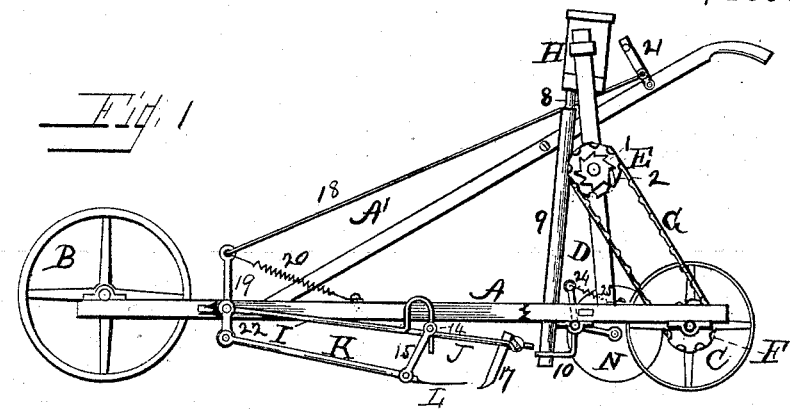
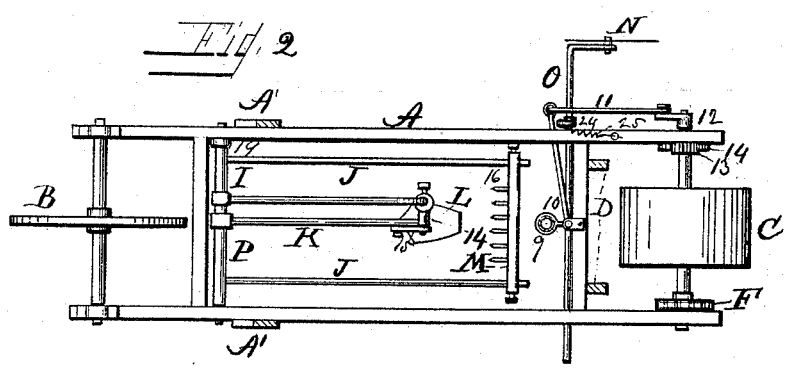
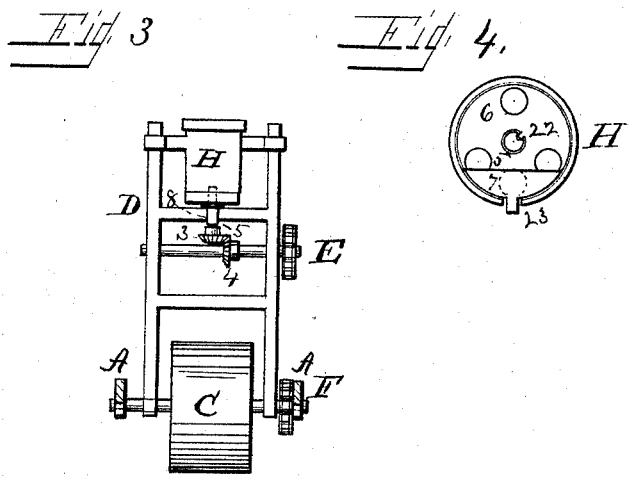
Witnesses
Carrie B. Darlington
Samuel B. Minich
Inventor
Virgil G. Richey
By His Attorney B. Pickering

UNITED STATES PATENT OFFICE.

VIRGIL G. RICHEY, OF DAYTON, OHIO, ASSIGNOR OF ONE-HALF TO GEORGE W. POTTLE, OF SAME PLACE.

SEED-PLANTER.

SPECIFICATION forming part of Letters Patent No. 526,744, dated October 2, 1894.

Application filed June 9, 1894. Serial No. 514,084. (No model.)

*To all whom it may concern:*

Be it known that I, VIRGIL G. RICHEY, a citizen of the United States, residing at Dayton, in the county of Montgomery and State of Ohio, have invented certain new and useful Improvements in Seed-Planters; and I do hereby declare that the following is a full, clear, and exact description of the invention, which will enable others skilled in the art to which it appertains to make and use the same, reference being had to the accompanying drawings, and to the letters and figures of reference marked thereon, which form a part of this specification.

My invention relates to improvements in seed planters, the several features of which will be fully hereinafter described and claimed.

The object of my invention is the planting of garden seeds in a uniform and expeditious manner. The object is accomplished by the mechanism illustrated in the accompanying drawings, in which—

Figure 1 is a side elevation of the machine with a portion of the side rail cut away. Fig. 2 is a plan of the machine, showing only the lower parts. Fig. 3 is a front elevation of the rear portion of the same. Fig. 4 is a plan of the seed-box.

Like letters and numerals designate like parts throughout the several views.

The wooden frame A comprises the side rails connected by cross-pieces, and to said rails are attached the two handles A', only one of which is fully shown. To the rear end of this frame is attached the vertical frame D, on which are supported the seed box and the necessary contiguous parts. The frame is supported at the front on the ground wheel B, which has a narrow tread, and the ground wheel C at the rear which is broad and flattens the earth. On the axle of the latter wheel is attached the sprocket wheel F. Within bearings of the frame D is supported a shaft provided with a like sprocket wheel E, and these are connected by the sprocket-chain G. The sprocket-wheel E is loose on its shaft, and adjacent to it, is the ratchet wheel 1 rigidly attached to said shaft, and the pawl 2 on said sprocket-wheel engages said ratchet-wheel, in a forward movement, and causes the same to rotate and thereby operate the dropping plate 6. On the shaft of the latter sprocket wheel is the miter wheel 4, which engages a like miter wheel 3 on the vertical shaft 5. It has its bearing in the cross-piece of frame D and terminates in the seed box H; and a groove is cut in the side, to receive the projection 22 of the dropping plate 6. This dropping-plate is provided with three orifices registering with the outlet, orifice 7, indicated by dotted lines, Fig. 4. The plate 23 is provided with a brush not shown on its under surface, and an arm extends outwardly and occupies a notch of the seed box to hold it in position.

The seed box is constructed as usual, and to adjust the same to different seeds, I use dropping plates of varying thicknesses adapted to the varying size and quantity of seed as is found necessary. A metallic spout 8 is attached to the bottom of the seed-box, and to this is attached a flexible hose 9 of leather or rubber, to convey the seed to near the soil.

On the main axle is attached the rack wheel 14, which engages the pinion 13, the shaft of which has a bearing in the side of the frame, and on the outer end of which is attached the crank 12. This crank is connected to the bell-lever 10 by the rod 11. This lever is pivoted to the cross-piece at the center of the frame, and its end terminates in a ring, which embraces the lower end of the seed spout. This gives a lateral vibratory movement to the spout, and distributes the seed quite uniformly.

The rod O is held in bearings on the under side of the frame. The back end is bent at a right angle, and to this is pivoted the circular disk plate N. The arm 24 is attached to this rod, and the spiral spring 25 connects the top of this arm to the frame, and this spring holds the periphery of the disk to the soil, and serves solely as a marker or guide for the planter.

The shaft P has bearings in the forward part of the frame. On the back end is attached the arm 19, which is connected by the rod 18 with the lever 21, pivoted to the inside of the upper end of the handle, and is connected to the frame by the spiral spring 20. The effect of this spring is to hold the soil stirring implements in the soil. By forcing the hand lever forward the same are raised from the soil.

The two rods J, J extend rearwardly, and to these the implements are attached as the hoe 17, as shown at Fig. 1, and the harrow 16, as shown at Fig. 2. These rods pass through orifices in the bars to which the hoe or teeth are attached and are fastened by screws. Arm 22 is attached to this shaft and pivoted to it is the rod K, to the end of which is attached the plate or leveler L. The rod I is attached to this shaft. At its rear end is a reverse curve, and on the vertical part is the sleeve 14 fastened by a screw, and the connecting bar 15 unites the sleeve and the leveler, and by this means the depth of the penetration of the hoe or harrow teeth may be regulated.

In operating the planter, it is pushed along by hand, the soil is stirred, the seed is dropped and distributed automatically.

Having fully described my invention, what I claim, and desire to secure by Letters Patent, is—

1. In a seed-planter the combination of the frame mounted on ground wheels, the shaft P, having bearings in said frame, the draft rods J J, the supporting rod I provided with adjusting sleeve and connecting bar, rod K with its leveling plate L, the hoe attached to said draft rods, the arm 19 spiral spring 20, rod 18 and lever 21 to raise the implements from the soil, substantially as described.

2. In a seed-planter the combination of the driving ground wheel C, the sprocket wheel F attached to the shaft of the same, the sprocket-chain G, the loose sprocket-wheel E with pawl 2 attached, the ratchet-wheel 1 fixedly attached to the shaft, the miter wheels 3 and 4, the shaft 5, the seed box H and the seed spouts 8 and 9, substantially as described.

3. As a vibrator for the distribution of seed, the combination of the driving wheel C, the rack wheel 14, the pinion 13, the crank 12, connecting rod 11, bell crank 10 provided with an eye on its inner arm, and the flexible spout 9 held in the eye of the bell-crank, substantially as described.

4. As a marker for a seed-planter the combination of the frame A, the rod O having a bend at a right angle and held in bearings of the frame, the circular disk N pivoted to the transverse end, the arm 24 attached to said rod and the spiral spring 25 connecting said arm to said frame, substantially as described.

In testimony that I claim the foregoing as my own I affix my signature in presence of two witnesses.

VIRGIL G. RICHEY.

Witnesses:
   B. PICKERING,
   MICHAEL CAHILL.